United States Patent [19]

Tlaker et al.

[11] 4,125,056

[45] Nov. 14, 1978

[54] SPINDLE STRUCTURE FOR GEAR SHAPING MACHINE OR THE LIKE

[75] Inventors: Erich Tlaker; Harold G. Haseltine, both of Springfield, Vt.

[73] Assignee: Fellows Corporation, Springfield, Vt.

[21] Appl. No.: 758,350

[22] Filed: Jan. 10, 1977

[51] Int. Cl.$^2$ .............................................. B23F 9/04
[52] U.S. Cl. ....................................... 90/7; 90/1.6 R; 91/39; 92/136
[58] Field of Search .......................... 90/7, 7.5, 1.6 R; 91/31, 39, 378; 92/31, 136

[56] References Cited

U.S. PATENT DOCUMENTS

| 2,217,666 | 10/1940 | Miller | 90/7 X |
| 3,587,394 | 6/1971 | Hilbrands | 91/39 |

FOREIGN PATENT DOCUMENTS

| 700,141 | 12/1940 | Fed. Rep. of Germany | 91/39 |
| 52,759 | 3/1967 | Poland | 90/7 |

*Primary Examiner*—John Sipos

*Attorney, Agent, or Firm*—McCormick, Paulding & Huber

[57] ABSTRACT

A hydro-mechanically operated reciprocating spindle for a machine tool is disclosed in the environment of a vertical gear shaper. The spindle comprises a piston which is slidable in a cylinder and which carries a cutting tool at its bottom end. The spindle-piston has two faces of different area to which hydraulic fluid under pressure is directed, the larger area face being used to drive the spindle downwardly in the cutting stroke, and the smaller area face being used to drive the spindle upwardly in the return stroke. Further, the spindle-piston has an axial bore which receives a vertically reciprocable valve. The valve is reciprocated by linkages driven by a rotating shaft, and the arrangement is such as to drive the valve downwardly and thus to move the spindle downwardly at a controlled velocity and under a controlled hydraulic force, and then as the valve is moved upwardly the spindle is moved upwardly on the return stroke at preferably a higher velocity.

13 Claims, 11 Drawing Figures

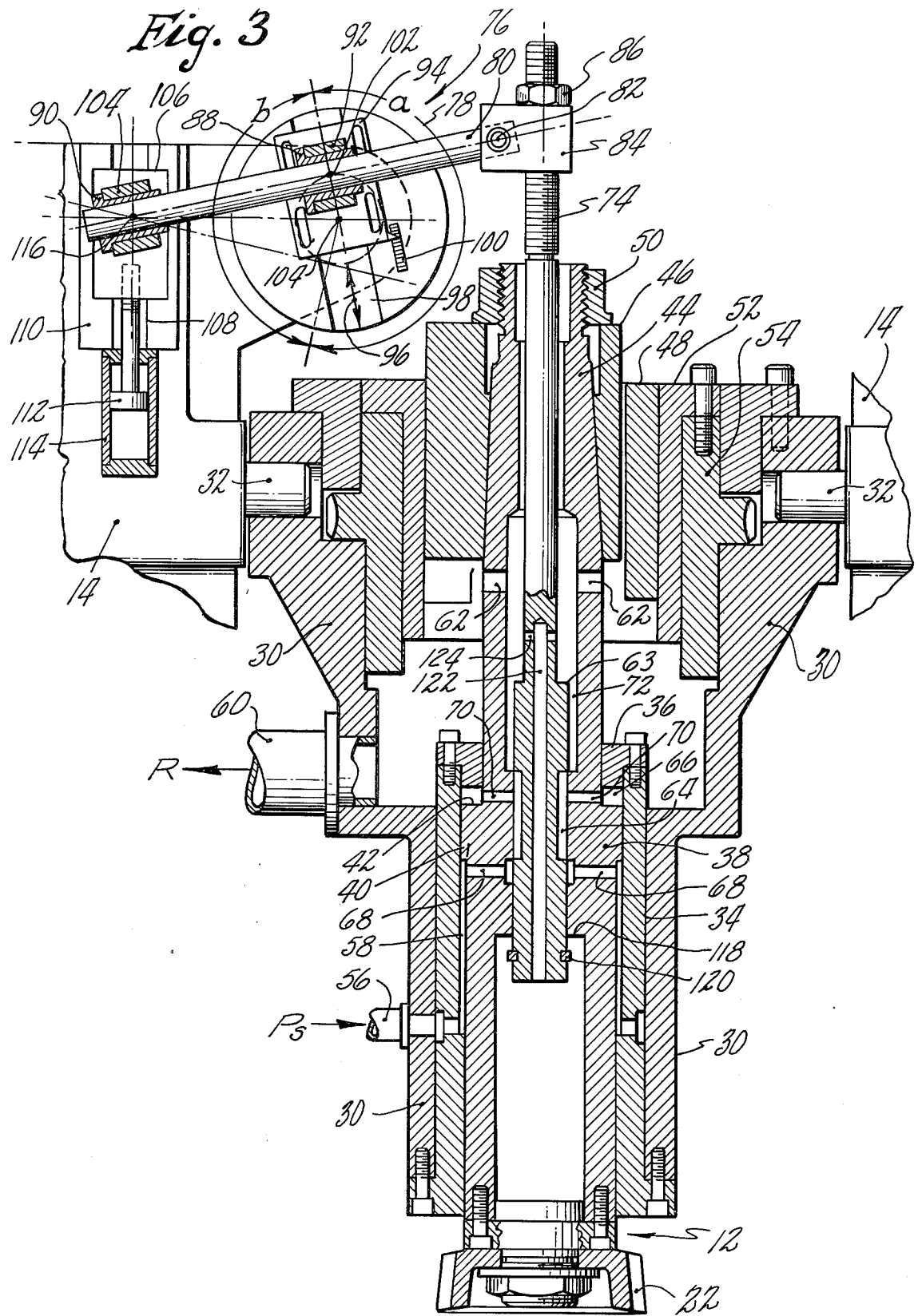

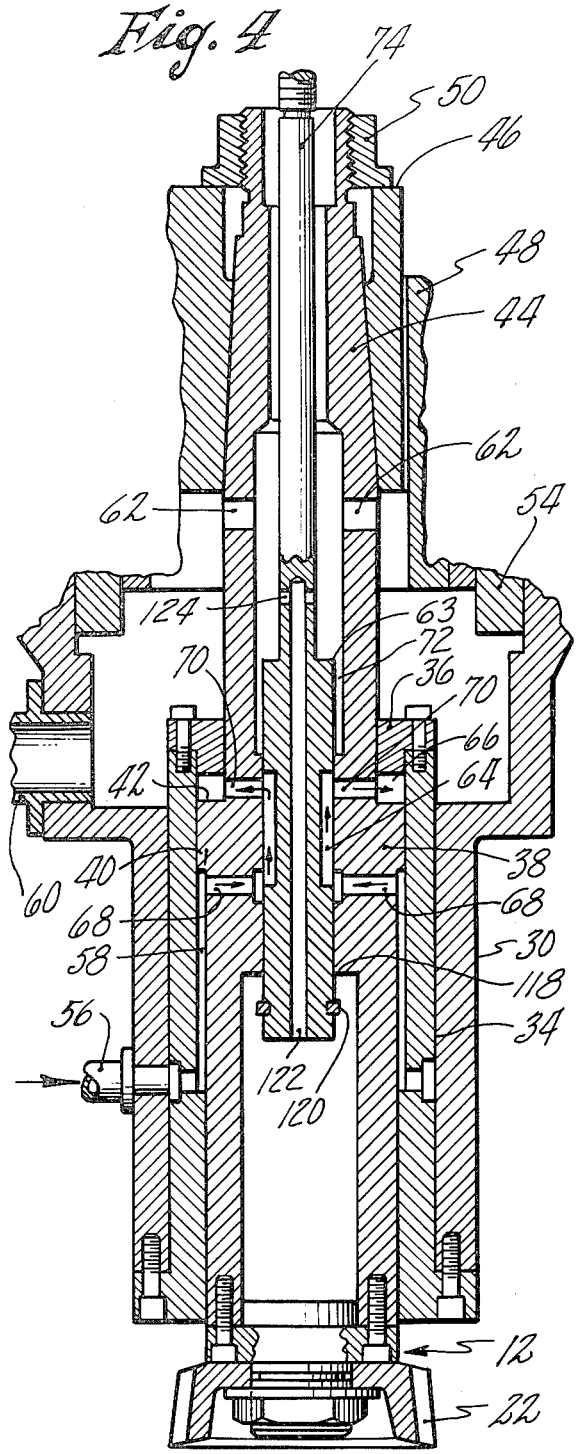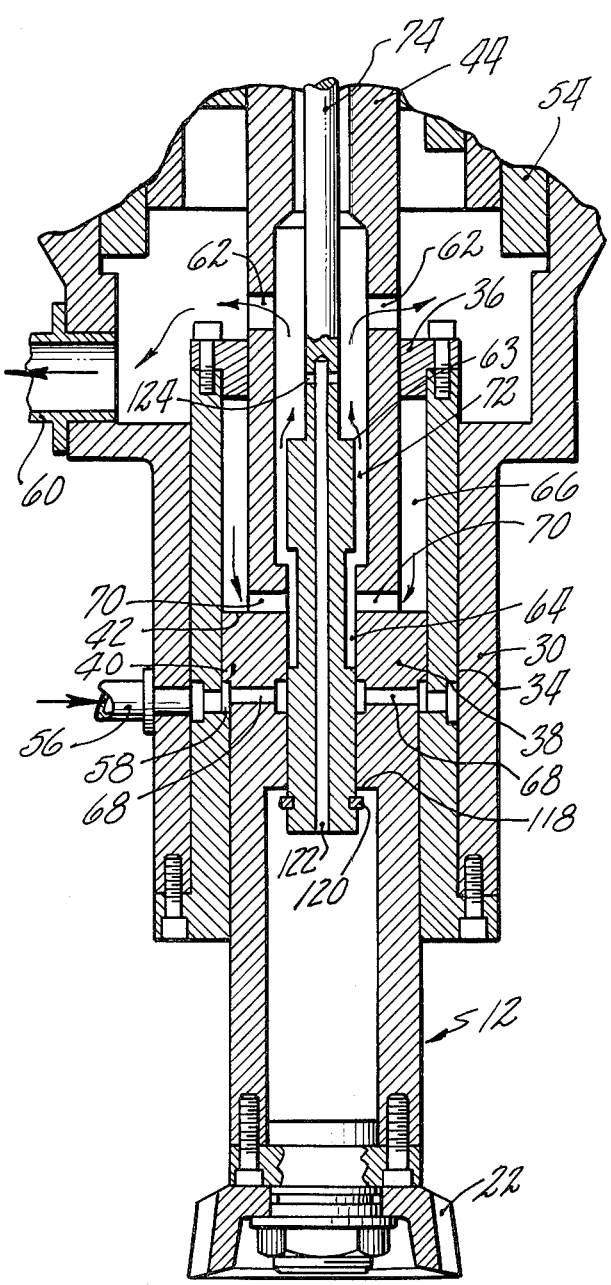

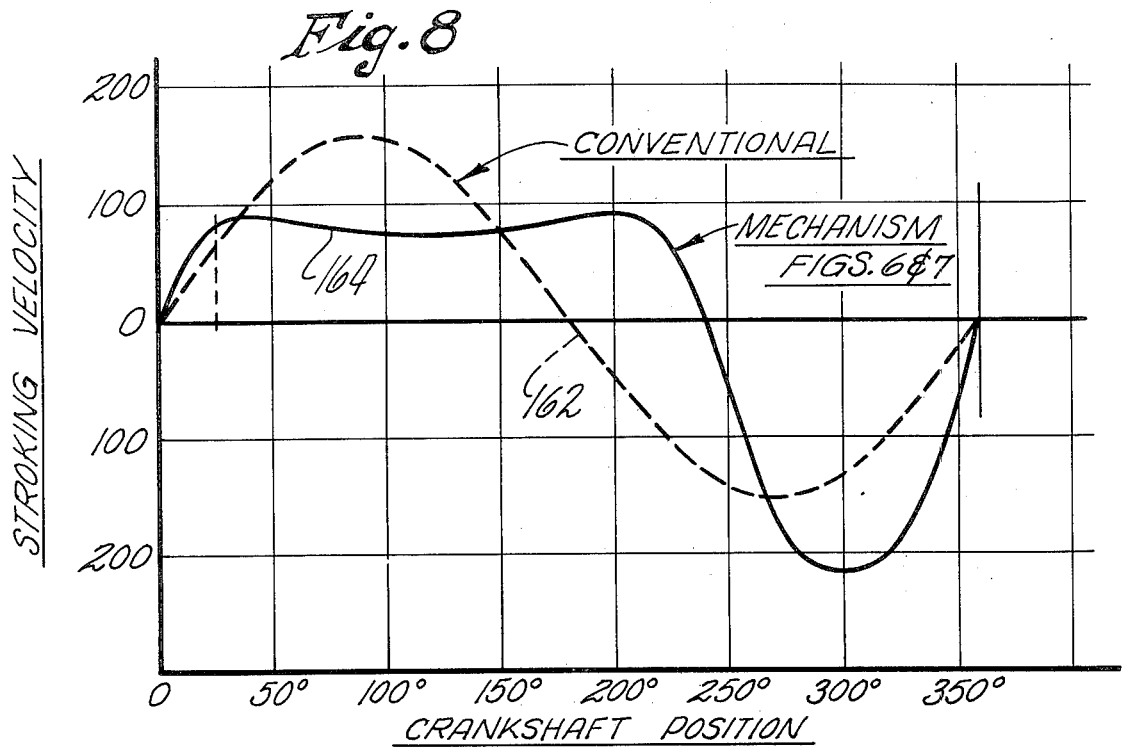
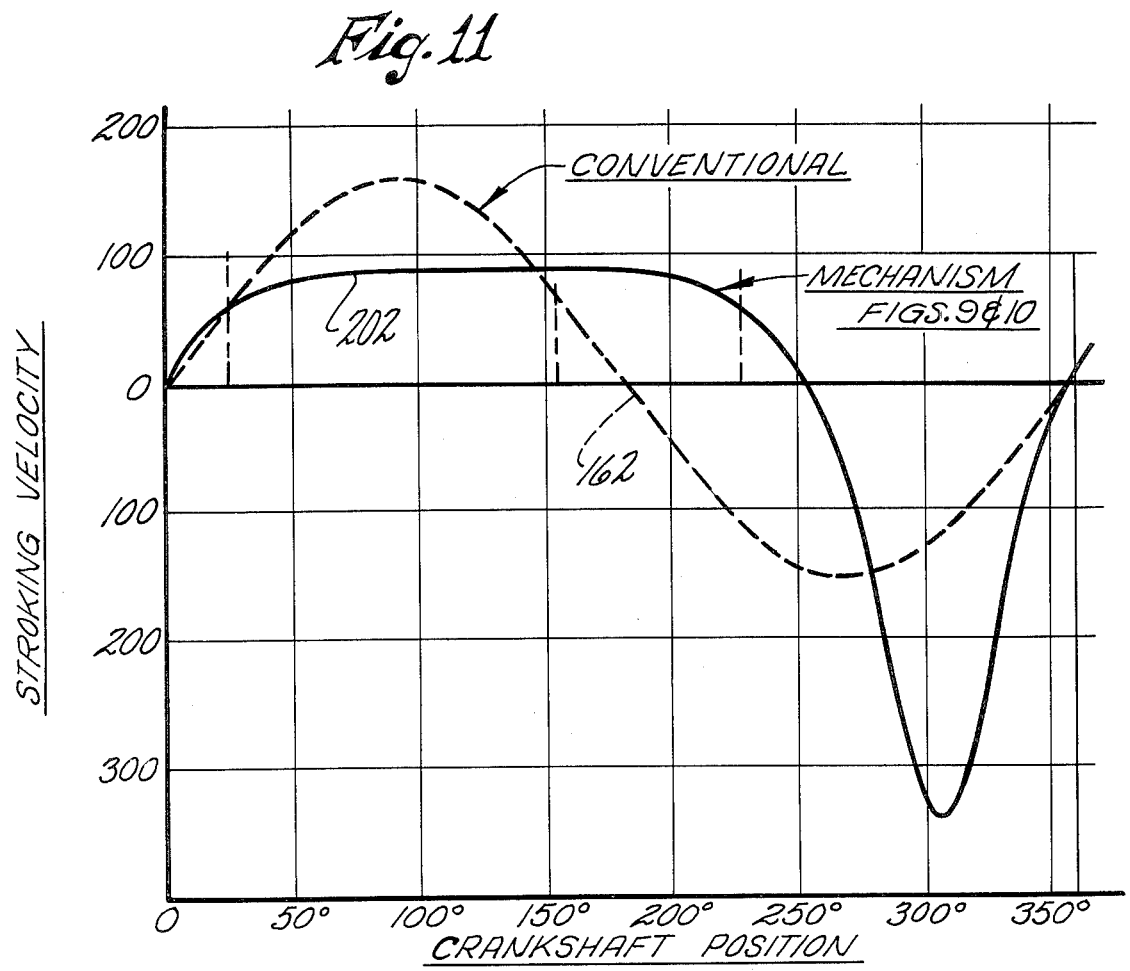

SPINDLE STRUCTURE FOR GEAR SHAPING MACHINE OR THE LIKE

BACKGROUND OF THE INVENTION

Most machine tools, such as gear shapers, which utilize a reciprocating spindle in a cutting stroke and a return stroke are mechanically operated, generally by a crank or by a rack and pinion. These mechanical drive structures must be designed with relatively great strength to withstand the cutting forces, and thus the drive mechanisms are usually heavy and cumbersome.

The speed at which such spindles can operate is usually dictated by the cutting tool. That is, the cutting tool can remove material from the workpiece only during the cutting stroke, and at the start of the return stroke which is usually performed on the second half cycle of one crank revolution, the cutting tool is moved away from engagement with the workpiece so as to avoid damage to its cutting edge. The return stroke thus represents lost time during machine operation, and in conventional machines, about half of the total operating time of the machine is lost time.

Further, while the conventional mechanically driven spindles can be operated at fairly high rates of speed, cutting tool life limits such speed of operation. That is, tool wear in a cutting operation such as is performed in a gear shaper increases alarmingly with increases in cutting velocity. For example, if the reciprocation of a spindle which has been operated at a reasonable rate is doubled, the life of the cutting tool may be quartered.

Accordingly, it is the general object of the present invention to provide a hydro-mechanically operated spindle for a gear shaper or the like which eliminates the heavy and cumbersome drive components of mechanically operated shapers and which will provide precise control for the speed of both the cutting and return strokes of the spindle so that the return stroke can be speeded up and reduce "lost time" and so that the cutting stroke can be controlled to extend tool life at present rates of production or to maintain the present tool life at higher rates of production.

SUMMARY OF THE INVENTION

In accordance with the present invention a fluid operating and control mechanism is provided for axial reciprocation of a spindle in a machine tool which has a cylinder and wherein the spindle comprises a piston slidable in the cylinder. The piston has first and second faces in opposite directions which are respectively smaller and larger in area. A source of hydraulic fluid under pressure is maintained, and conduit means including a pressure line is connected with the source, the said pressure line being arranged continuously to direct fluid under the high pressure of the source against the lesser area face of the spindle-piston. The conduit means also includes a drain line which is connected with the larger area face of the piston for return of the fluid at much lower pressure to the source, but access to the drain line is selectively opened and closed by a valve.

The said spindle-piston has a central bore which provides a first passage between the lesser and larger area faces of the piston and which also provides a second passage between the larger area face of the piston and the drain line. The previously mentioned valve is reciprocable in the spindle-piston bore and it is arranged so that when it is moved in one direction it opens the first passage and closes the second passage, thereby to cause movement of the spindle in one axial direction in performance of the cutting stroke. When the valve is moved in the opposite direction it closes the first passage and opens the second passage and thereby causes spindle movement in the opposite axial direction, or the return stroke.

The valve is operated by linkages driven from a rotary shaft, and these linkages are adjustable to provide for adjustment of the length of valve movement in both axial directions and thus to provide for adjustment of the length of stroke of the spindle also. Further, the linkages can be adjusted to adjust the speed or velocity of valve and spindle movement in each axial direction, and they are adjustable so that the speed of return movement of the spindle can be greatly increased relative to the speed of spindle movement in the cutting stroke.

BRIEF DESCRIPTION OF THE DRAWINGS

FIG. 3 is a vertical cross sectional view through the spindle structure (on enlarged scale) of the machine shown in FIGS. 1 and 2, and illustrating a valve operating and control mechanism for the spindle of the present invention, the spindle and valve being shown at or near the top of their strokes and with the valve shown in what may be called a "neutral" position with respect to the spindle;

FIG. 4 shows the spindle in the same position as in FIG. 3, but shows the control valve moved downwardly as will be the case at the start of the cutting stroke which will bring the spindle downwardly in such cutting stroke;

FIG. 5 shows the spindle at the bottom of its cutting stroke and shows the valve moved upwardly relative to the spindle which will cause the spindle to move upwardly in its return stroke;

FIG. 8 is a graph showing the comparison of velocity performance of a spindle provided in accordance with the present invention (particularly incorporating the mechanism shown in FIGS. 6 and 7) with a conventional operating mechanism for a shaper or other machine tool spindle;

FIG. 11 is a view similar to FIG. 8, that compares the velocity performance of the linkage shown in FIGS. 9 and 10 with the conventional machine velocity performance.

DESCRIPTION OF THE PREFERRED EMBODIMENTS

Figure 2:
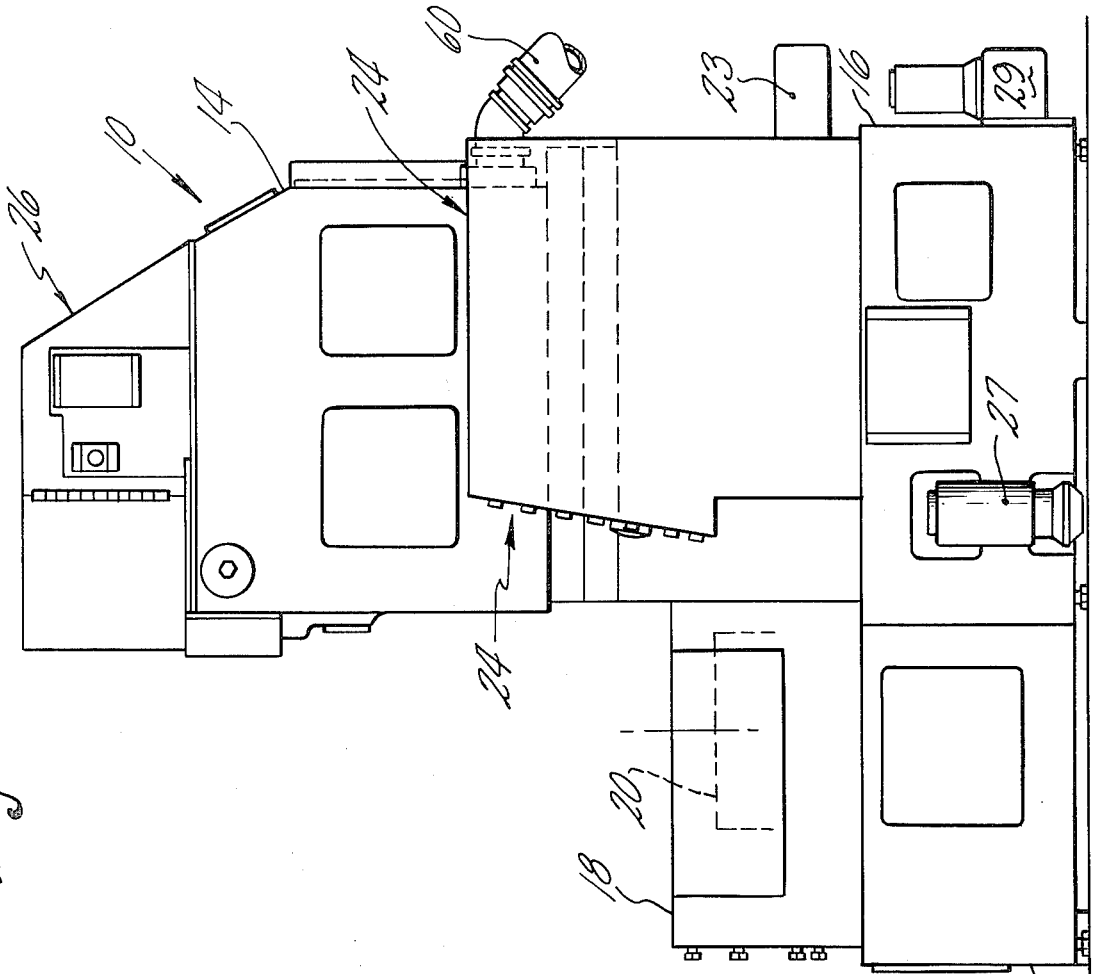
FIG. 2 is a side elevational view of the machine shown in FIG. 1 and at the same scale.
Figure 1:
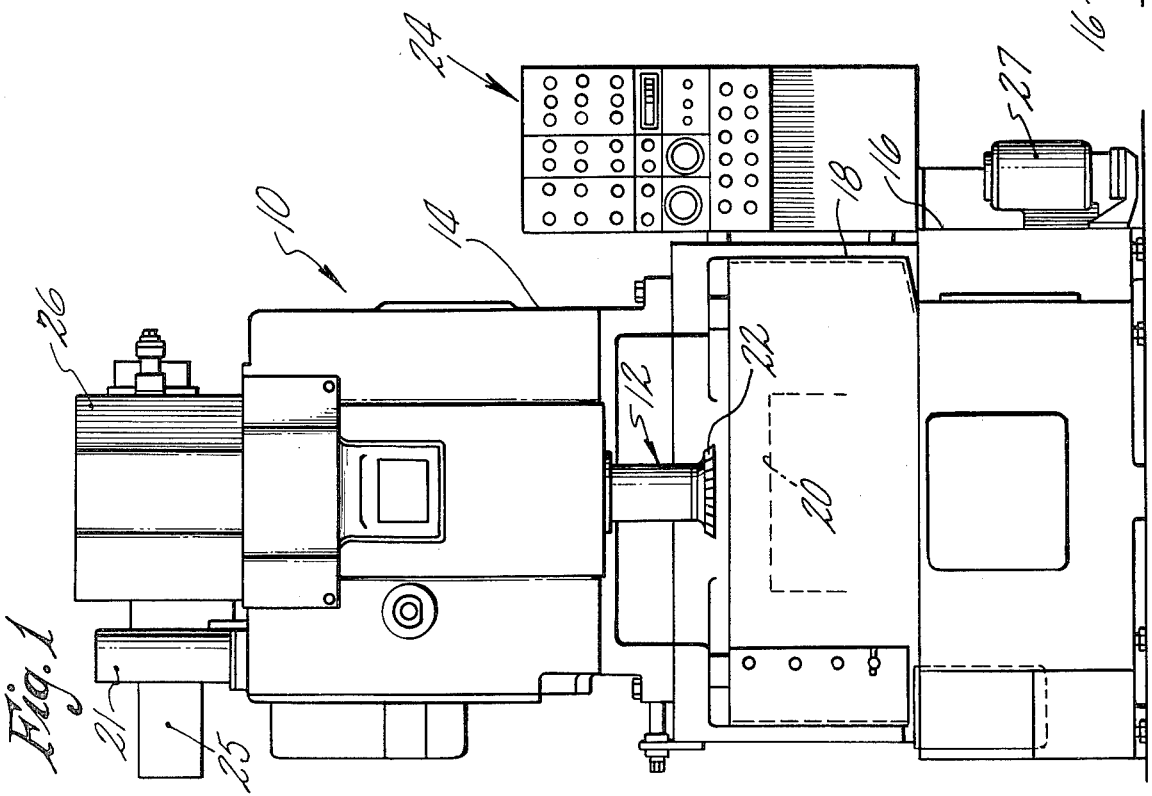
FIG. 1 is a front elevational view of a gear shaping machine incorporating the features of the present invention.

FIGS. 1 and 2 illustrate in general outline a gear shaping machine tool which incorporates the features of this invention relating to the construction, operation and control of its vertically reciprocating spindle 12

(only in FIG. 1). Such gear shaper or other machine tool includes a frame 14 mounted upon a base 16 which is set upon a floor and which in addition to supporting the frame 14 supports a working area enclosure 18. Within the working enclosure 18 there is mounted a workpiece support table 20 which, in the case of a gear shaper, is used to mount a workpiece relative to the spindle 12.

A cutting tool 22 is secured to the lower end of the spindle 12 to cut gear teeth in a workpiece located on the table 20 during vertical reciprocation of the spindle. In keeping with conventional gear shaping technique, a rotary feed drive motor 21 (FIG. 1) is connected by suitable motion transmitting means (not shown) to the spindle 12 and to the workpiece table 20 to provide relative rotary motion between them as the spindle reciprocates relative to the table. In further keeping with conventional practice, a depth feed motor 23 (FIG. 2) is connected by suitable motion transmitting means (not shown) to the table 20 so as to move it horizontally forwardly and rearwardly relative to the spindle and thereby control the depth of cut in the workpiece during spindle stroking.

In addition to the foregoing, FIGS. 1 and 2 show an operator's control panel 24 providing button control for the shaper 10 so as to program and use electrical control of the hydraulics utilized in spindle and machine operation as described in the Tlaker and Nichols application Ser. No. 758,321, filed of even date herewith. FIGS. 1 and 2 also show a covered or guarded superstructure indicated generally at 26 for the mechanism which drives and operates the control or servo valve for the spindle 12 in shaper 10, the drive motor for the mechanism being shown at 25. In addition, a pump-motor 27 is shown in FIGS. 1 and 2 for supplying coolant at the cutting location, and a pump-motor 29 is shown in FIG. 2 to supply hydraulic fluid under pressure for the spindle and machine, the fluid being later returned to the source or tank through a drain line 60.

As shown in FIG. 3, the spindle construction provided in accordance with the present invention is mounted in a saddle 30 which is supported in the machine frame 14 for limited pivotal movement about a horizontal axis on oppositely facing stub shafts 32, 32. The lower end portion of the saddle 30 is preferably of generally rectangular horizontal section and it has a central vertical bore wherein a cylinder 34 is secured. The top of the cylinder 34 is closed by a cover 36 having a central opening to receive a portion of the spindle 12, and it will be seen that the lower portion of the said spindle projects downwardly from the cylinder 34 and the saddle 30. It is this lower end of the spindle 12 which carries the cutting tool 22, as previously mentioned.

The spindle comprises or includes a piston section 38 slidable within the cylinder 34. The piston section 38 has a bottom first face 40 of relatively small area against which hydraulic fluid under pressure may act to move the spindle-piston upwardly, and the said section has an upper second face 42 of larger area against which hydraulic fluid may act to force the spindle-piston downwardly in the cutting stroke. It will be seen that the spindle-piston is hollow, that is, it has a vertical axial bore, and it will also be seen that it has an upwardly extending portion 44 which is received in a two-piece guide comprising the elements 46 and 48. The upper end of the spindle extension 44 is threaded and receives a nut 50 which mounts the spindle 12 securely on the guide member 46. The engaging faces of the guide members 46 and 48 may be straight or helical so that during vertical reciprocation of the spindle and connected guide member 46 relative to guide member 48 they cannot rotate relative to the member 48 with straight surfaces involved, or they can rotate relative to member 48 if helical engaging guide surfaces are involved. Obviously, straight guide surfaces are used when the cutter 22 and spindle 12 are adapted for cutting straight faced gear teeth as in a spur gear, and the helical surfaces are used when the spindle and cutting tool are to be used in cutting a helical gear.

The two-piece guide 46, 48 is mounted within the central vertical bore of a guide bushing 52 which is in turn mounted on a gear 54 so that the spindle and guide rotate with the gear on its vertical axis. The gear 54 is part of the motion transmitting means driven in timed relationship with the work support table 20 by the rotary feed drive motor 21, in keeping with conventional practice.

As previously mentioned, conduit means is provided for connection with a source of hydraulic fluid under pressure for operation of the spindle-piston 12. Said conduit means includes a pressure line 56 connected to the source pump-motor 29, and it extends through the cylinder 34 so as continuously to provide hydraulic fluid under operating pressure in the annular cylinder chamber 58 exposed to the lesser area first face 40 of the spindle-piston section 38. The conduit means also includes the drain or return line 60 opening into the saddle 30 and communicating through ports 62, 62 to the bore of the spindle 12 above its piston section 38 and above the cylinder cap 36.

As will be described in greater detail hereinafter, a vertically reciprocable valve member 63 is located on the vertical axis of the spindle 12 within its bore so as selectively to open and close passages defined by the spindle bore. The first such passage is indicated at 64 and it provides for flow between the annular piston chamber 58 and an annular piston chamber 66 at the top of the piston section 38 and over the upper exposed larger face 42 of the piston section. Horizontal ports 68, 68 provide for flow from the chamber 58 into the first passage 64 and similar horizontal ports 70, 70 provide for flow to and from the chamber 66 into the first passage 64. The second passage defined by the cylinder bore is designated by the reference number 72 and it provides for the flow of hydraulic fluid from the upper piston and cylinder chamber 66 to the drain ports 62, 62 and to the drain or return line 60. Flow through the said first and second passages 64 and 72 is controlled by movement of the previously mentioned valve 63.

Now, as best shown in FIG. 3, the valve member or spool 63 has an upwardly extending stem 74 having a threaded end portion which projects out of the axial bore of the spindle 12. One embodiment of a valve operating and control mechanism is indicated generally at 76 in FIG. 3 and it includes a shaft 78 which is driven in a clockwise direction as viewed in the drawing. (For convenience of illustration, the mechanism 76 is shown displaced 90° from its actual position. That is, in actual construction, the axis of the shaft 78 is parallel to the plane of the drawing rather than perpendicular to it, as shown.)

The mechanism 76 also includes a link 80 having one end pivotally connected at 82 to a bracket 84 receiving the threaded end portion at the top of the valve stem 74. The position of the bracket 84 on the stem 74 can be adjusted by loosening a lock nut 86 and then rotating the valve 63 before again tightening the lock nut 86 against the bracket. At about its midpoint, the link 80 is axially slidably received in a bushing 88, and near its other end it is similarly received in another bushing 90. The mid bushing 88 is supported in a carrier 92 which is in turn pivotally mounted on a slide 94 reciprocable as indicated by the double-head arrow 96 in a way 98 on the end of the shaft 78. The slide is adjusted by means of an adjustment screw 100 relative to the shaft 78 thereby adjusting the eccentricity or spacing of a point 102 on the axis of the link 80 from the axis 104 of the shaft 78. The point 102 lies at the intersection of the axis of the link 80 and the center line of the slide 94 along its path of adjustment 96.

The bushing 90 is also supported in a carrier 104 which is pivotally mounted on a slide 106 which can be adjusted vertically in a way 108 in a bracket 110 which is mounted on a portion of the frame 14. The slide 106 is adjusted up and down by means of a piston 112 movable in a cylinder 114. A point 116 is defined on the axis of the link 80 at its intersection with the vertical line of adjustment of the slide 106.

With the arrangement just described, when the shaft 78 is driven to rotate in a clockwise direction as viewed in FIG. 3 by the stroking linkage drive motor 25 (FIG. 1), the valve 63 will be driven through one complete cycle of vertical reciprocation. The valve is shown in FIG. 3 at its uppermost position, and as will be seen from the position shown for the elements of the linkage mechanism 76, the downstroke of the valve is completed by rotation of the shaft 78 through an arc (a), and the return stroke is completed by rotation of the shaft through an arc (b). It will be seen that the arc (a) is substantially greater than 180° and that the arc (b) is substantially less than 180°. Thus, as the shaft 78 is rotated at constant speed, the downstroke of the valve will take substantially longer than the up or return stroke.

The magnitude or amplitude of the valve strokes is adjusted by adjusting the amount of eccentricity of the point 102 about the axis 104 of the shaft 78. That is, when the eccentric spacing of the point 102 is reduced, by adjusting the slide 94, the stroke amplitude for the valve 63 is reduced. The position of the valve 63 at the top and bottom of its stroke is adjusted be vertical adjustment of the slide 106 by means of the piston 112, thereby adjusting the vertical position of the pivot point 116 for the link 80. As previously mentioned, the top and bottom positions for the valve 63 can be further adjusted by loosening the lock nut 86 and by rotating the valve stem 74 in threaded bracket 84. As will be described in more detail, the spindle 12 follows the valve 63 downwardly and upwardly, and the amplitude of valve stroking and the top and bottom positions for the valve are adjusted to achieve proper spindle stroking for workpieces of different vertical dimension or thickness.

It is to be noted that when the amplitude of valve stroking or reciprocation is reduced by reducing the eccentricity of the point 102 relative to the point 104, the arcs (a) and (b) become more equal. This will mean that the valve and spindle downstroke velocity will more nearly equal the return stroke velocity with the shaft 78 being rotated at constant speed. The capability for adjustment of the amplitude of valve and spindle reciprocation is an important consideration for cutting tool life. That is, by slowing down the downstroke or cutting stroke, extends tool life over that experienced in conventional machines, but without sacrifice in production, because the return stroke can be effected more quickly than in conventional machines. Thus, in operation of the spindle according to this invention, more production can be achieved with a cutting tool that will last as long as would be expected in a conventional machine, or cutting tool life can be extended at the same rate of production experienced with conventional machines. This, of course, is due to the fact that cutting tool life is greatly extended with a reduction in cutting stroke velocity.

In considering operation of the spindle mechanism, assume at the outset that the stroking mechanism 76 is at rest, and the stroking drive motor is off, and that no hydraulic fluid has been introduced. Assume also that the mechanism 76 rests in a position shown in FIG. 3 wherein the valve 63 is at the top of its stroke. Under such conditions, the weight of the spindle 12 will cause it to drop from the position shown in FIG. 3 until a bottom interior wall 118 in the hollow spindle comes to rest upon a stop snap ring 120 secured about the bottom end portion of the valve 63. In such position of the spindle relative to the valve, the ports 68, 68 will be closed by the valve 63 and will not permit flow of hydraulic fluid from the annular chamber 58 at the bottom of the spindle piston portion 38 to the first passage 64.

Then, when the hydraulic fluid at supply or source pressure $P_S$ is supplied at the line 56 from the pump-motor 29, the fluid will enter the annular chamber 58 and act upon the lower or first face 40 of smaller area and will elevate the spindle 12 relative to the valve member or spool 63. The spindle will continue to be elevated until such time that the ports 68, 68 are opened to permit hydraulic flow into the first passage 64 and then on into the ports 70, 70 and the chamber 66 at the top of the spindle piston portion 38. The hydraulic fluid in the chamber 66 acts upon the larger area second face 42 and will reach a point where the pressure within the chamber 66 acting upon the face 42 will move the spindle downwardly. This downwardly acting hydraulic force is added to by the weight of the spindle, and the spindle will lower to a position where balance occurs between the weight and hydraulic force moving downwardly equals the hydraulic force biasing the spindle upwardly. This position of balance of the spindle relative to the valve is that shown in FIG. 3. FIG. 3 also reflects the position of the valve and spindle at the top of their strokes, just prior to the start of the cutting stroke.

Now, upon energization of the stroking linkage drive motor 25, clockwise rotation of the drive shaft or crankshaft 78 will commence through the arc (a) to move the valve 63 downwardly. Such initial downward movement of the valve 63 will displace it relative to the spindle 12 to the position shown in FIG. 4. In such position, the ports 68, 68 are opened to permit hydraulic fluid flow from the chamber 58 acting on the face 40 into the first passage 64, and a pressure drop occurs in the said first passage. This reduced pressure is introduced to the larger area second face 42, and due to the larger area, the hydraulic force on the top of the spindle piston portion 38 overcomes the resisting hydraulic force on the bottom of the said piston portion and this causes the spindle-piston 12 to move downwardly, thus following the motion of the valve 63. Negative hydraulic feedback occurs because as the valve spool moves downwardly the spindle-piston motion is in the same direction, thus tending to close communication between the chamber 58 and the first passage 64. The degree of opening between the said chamber and first passage at the ports 68, 68 is governed by the supply pressure $P_s$, the downward velocity of the valve spool 63 and the available pressure drop in flow from the chamber 58 into the first passage 64. The required hydraulic fluid volume for the downward stroke of the spindle 12 is equal to the area of the face 42 minus the area of the face 40 times the linear displacement of the spindle.

As the spindle 12 and cutting tool 22 follow the valve spool 63 in descent, a position is reached wherein the cutting tool engages the workpiece and thus encounters resistance to further downward movement of the spindle. When this occurs, the spindle-piston lag relative to the valve member 63 increases the opening between the ports 68, 68 and the first passage 64. This, of course, reduces the pressure drop in the hydrualic fluid flowing from the chamber 58 into the first passage and thus the pressure in the chamber 66 at the top of the piston portion 38 is increased thereby to increase the hydraulic force moving the spindle downwardly. This increased hydraulic force provides the cutting force necessary to move a cutting tool through the actual cutting stroke in the workpiece, this because the supply or source pressure $P_s$ is selected at a high level.

Obviously, with the valve operating mechanism 76, as the valve 63 approaches the end of its downward stroke its velocity decreases and will reach "zero" at the bottom of the stroke. As the valve velocity decreases, there is relative movement between the valve 63 and the spindle 12 tending to close the opening between the ports 68, 68 and the first passage 64, thus increasing the pressure drop between the chamber 58 in the first passage and reducing the hydraulic force applied to the face 42 in moving the spindle downwardly. This natural occurrence or phenomenon makes it desirable to adjust the stroke of the valve and the following spindle so that downward movement of the spindle will be well started before the workpiece is engaged by the cutting tool and will not be completed until the cutting tool has moved substantially below the workpiece. This, then provides for more uniform velocity of the spindle and cutting tool while the tool is moving through the workpiece in its downward or cutting stroke. As the valve 63 and following spindle 12 approach the end of the downward stroke, their relative positions will change from that depicted in FIG. 4 back toward that shown in FIG. 3, the FIG. 3 relative position being obtained at the end of the downward stroke.

Then, during continued rotation of the shaft 78 the valve spool 63 will be elevated and move upwardly relative to the spindle 12 toward a position such as shown in FIG. 5. As the valve 63 moves upwardly relative to the spindle 12, communication between the chamber 58 and the first passage 64 is closed by the valve which also opens communication between the chamber 66 and the second passage 72 leading to the drain line 60 as shown in FIG. 5. The spindle-piston 12 follows the valve 63 because hydraulic fluid under source pressure $P_s$ acts upon the bottom or first face 40 to thrust the spindle upwardly. Accordingly, the spindle-piston follows the valve upwardly as it did downwardly, but the upward movement is much faster because the upward movement is emcompassed within the smaller arc (b) in the one cycle of rotation of the shaft 78 as previously explained. The drain or return pressure of the hydraulic fluid may be as low as atmospheric pressure, but in any event it is substantially less than the source or supply pressure. Any hydraulic fluid which may collect in the hollow bottom end of the spindle 12 is permitted to drain through a central valve spool passage 122 and transverse ports 124 into the second passage 72 and thus to the drain line 60.

It will be understood from the foregoing description that the valve 63 functions as a servo for the spindle 12. That is, as the valve moves in one direction the spindle follows and this operating relationship will occur no matter what mechanism is utilized to reciprocate the valve. It has been explained that with the mechanism 76, that when the amplitude of the valve stroke is increased the ratio of return stroke velocity to cutting stroke velocity is increased, and with the reduction of amplitude the ratio of return stroke velocity to cutting stroke velocity is reduced.

Figure 6:
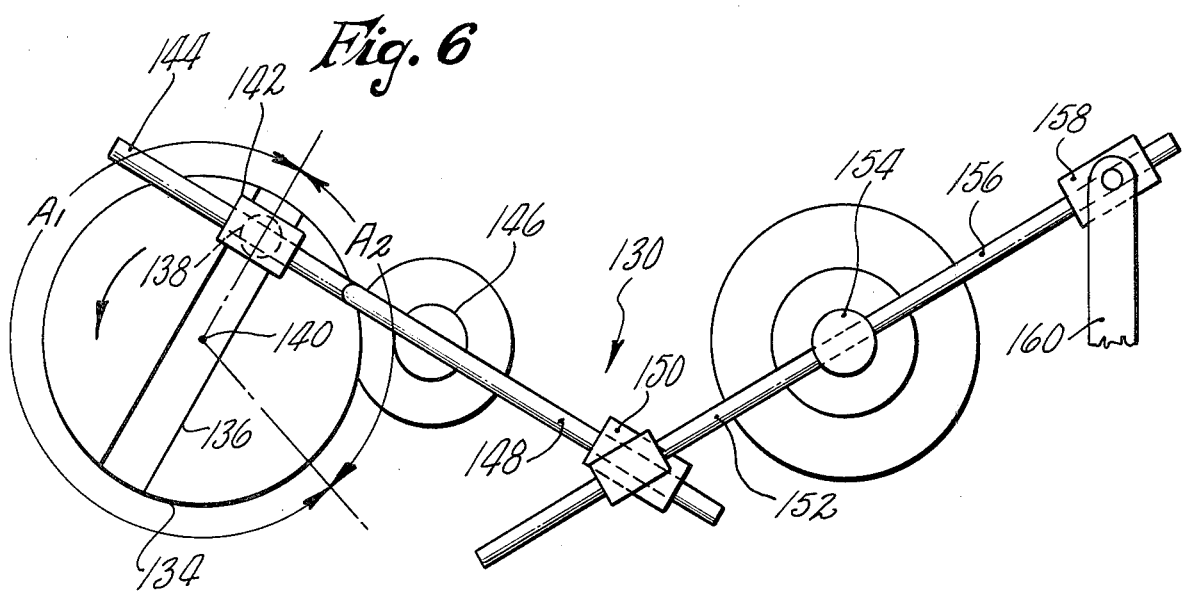
FIG. 6 is a vertical elevational view of an alternative linkage mechanism utilized to convert the rotary motion of a valve drive and control shaft to the reciprocatory motion of the valve.
Figure 7:
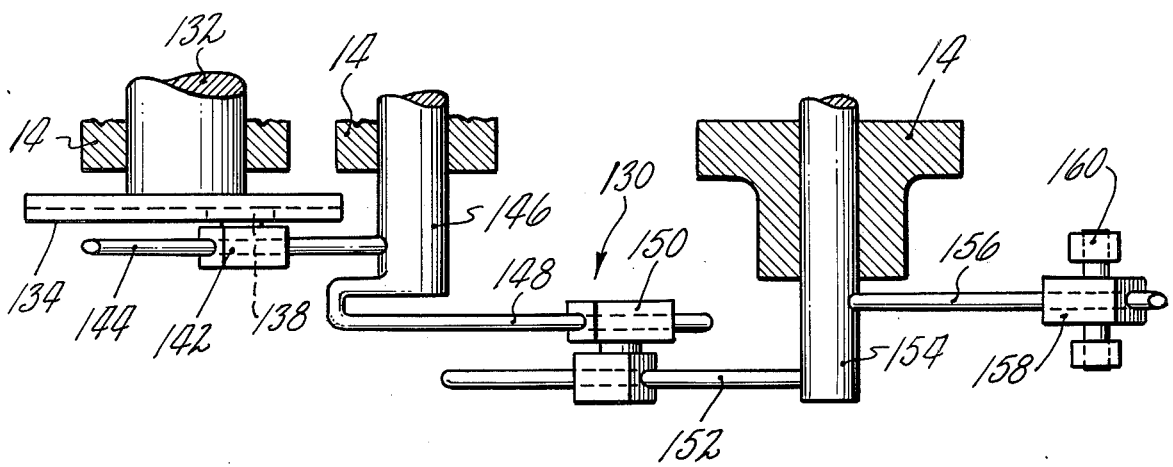
FIG. 7 is a top plan view of the linkage shown in FIG. 6.

The alternative valve drive linkage mechanism indicated generally by the reference number 130 in FIGS. 6 and 7 is particularly adapted to provide a constant ratio between return stroke velocity and cutting stroke velocity throughout the whole range of adjustment of valve stroke amplitude. However, the mechanism 130 is capable of adjustment so as to select the ratio between velocities of the return stroke and cutting stroke.

Like the previously described construction, the mechanism 130 includes a crankshaft 132 rotatably supported in a portion of the machine frame 14 (FIG. 7) and which can be driven at a continuous rate of rotation as by the drive motor 25. The end of the said crankshaft is provided with a circular flange 134 having a diametrically arranged way 136 across its face to receive a crankpin 138. The arrangment is such that the crankpin can be secured in any adjusted position along the way 136 so as to fix its spacing or eccentricity from the axis 140 of the crankshaft 132. As will be understood from the following description, it is this adjustment of crankpin eccentricity which adjusts the ratio of velocity of the return stroke to the cutting stroke.

The crankpin 138 rotatably supports a first slip-joint device 142 which slidably receives a first lever 144 extending from a nondriven first stub shaft or pivot shaft 146 which is rotatably mounted in the frame 14. Thus, as the crankshaft 132 rotates at constant velocity, the lever 144 slides axially within the pivot joint 142 and this results in non-uniform angular velocity for the pivot shaft 146.

The first pivot shaft 146 also secures a second lever 148 which, in the embodiment shown is parallel to the first lever 144. The lever 148 is free to slide axially in a portion of a second slider joint 150. The second slider joint 150 is secured in selected position along the length of a third lever 152 extending from a second pivot shaft 154. A fourth lever 156 also extends from the pivot shaft 154 and it is received for axial sliding movement in a third slip-joint 158 which is pivotally mounted in a clevis or the like 160 adjustably secured to the upwardly projecting portion of the stem 74 of the valve 63. In the embodiment shown, the third and fourth levers 152 and 156 are parallel and extend oppositely of each other. By adjusting the position of the second slider joint 150 along the lever 152 the stroke amplitude of the valve and thus the spindle is adjusted.

Therefore, with the mechanism embodiment shown in FIGS. 6 and 7 by adjusting the position of the first slider joint 142 relative to the axis 140 of the crankshaft 132 one adjusts the ratio of downward stroke velocity to return stroke velocity for the valve and spindle, but this ratio of velocities maintains for any amplitude of stroke which is selected by adjustment of the position of the second slider joint 150 along the lever 152. As in the first described mechanism, when the crankshaft 132 is rotated at a constant velocity (in a counterclockwise direction as viewed in FIG. 6) the downward stroke of the valve and spindle will take place during the arc $A_1$ and the return stroke will take place during movement of the crankshaft 132 through the arc $A_2$. The ratio of the arcs $A_1$ to $A_2$ sets the ratio of the velocities. When the spacing between the slider joint 142 and the axis 140 is relatively great, most of the time taken in one cycle of reciprocation is utilized in the cutting stroke through the arc $A_1$ and a relatively small amount of time is taken for the return stroke through the arc $A_2$, and this ratio will maintain for any stroke amplitude provided by adjustment of the second slider joint 150 on the lever 152.

Although the axes of the crankshaft 132, the pivot shaft 146 and the pivot shaft 154 are all shown to lie in the same plane, the axis of the shaft 146 can be placed in any parallel position around the axis of the shaft 132, and the axis of the shaft 154 can be placed in any position parallel to the shaft 146 and around that shaft. In so relocating the shafts, the basic motion provided in the mechanism will maintain as long as the same lever relationships are maintained.

In FIG. 8 a plot is provided for purposes of comparing the cutting and return stroke velocities of a conventional crank driven spindle with the cutting and return stroke velocities of a spindle operated by the mechanism shown in FIGS. 6 and 7. It will be seen that the velocity curve 162 for the conventional or gear driven spindle is essentially sinsuoidal. That is, on a scale of 200 during 180° of crank rotation for the cutting stroke the velocity increases from 0 to a value of about 160 and then returns to 0. During the return stroke, the velocity again moves from 0 to a value of approximately 160 and returns to 0. However, with the curve 164 produced by the mechanism of FIGS. 6 and 7 the valve during the downstroke or cutting stroke goes from 0 to a level less than 100 and then returns to 0, but this in approximately 240° of crankshaft rotation. Then, during the remainder of approximately 120° rotation for the crankshaft the velocity goes from 0 to a value in excess of 200 and returns to 0.

Figure 9:
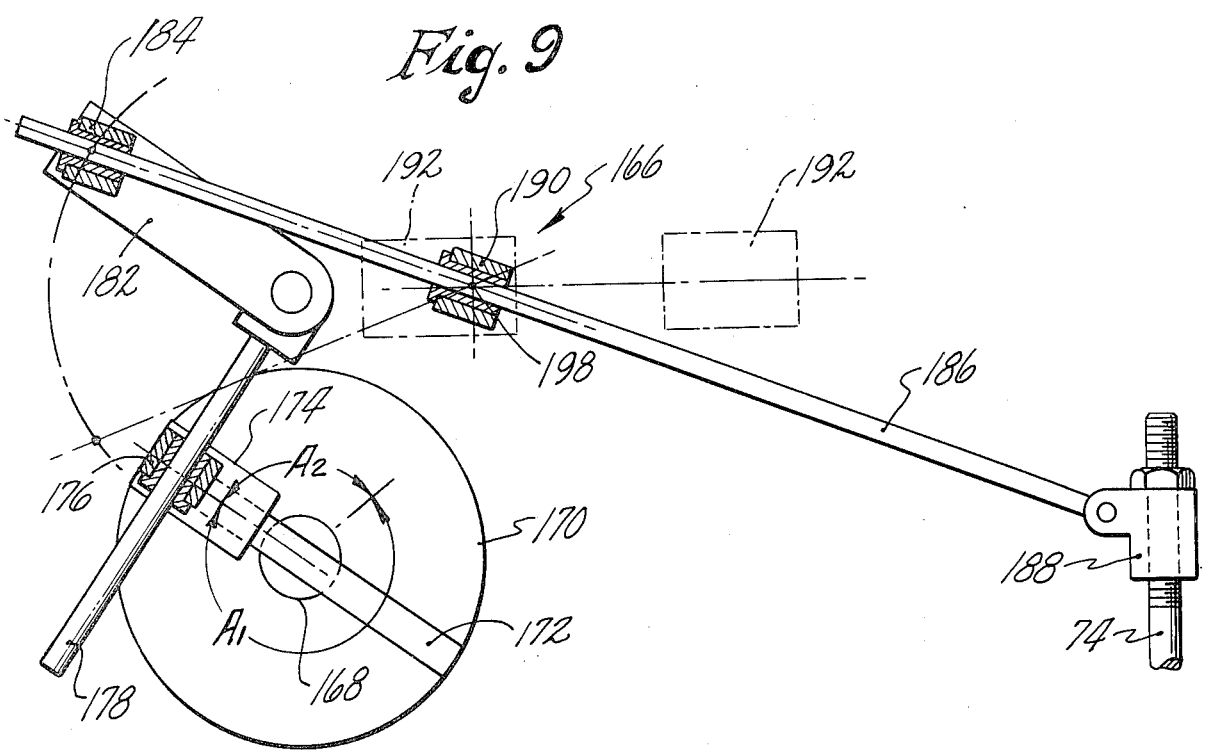
FIG. 9 is another vertical elevational view of another form of linkage such as shown in FIGS. 3 and 6.
Figure 10:
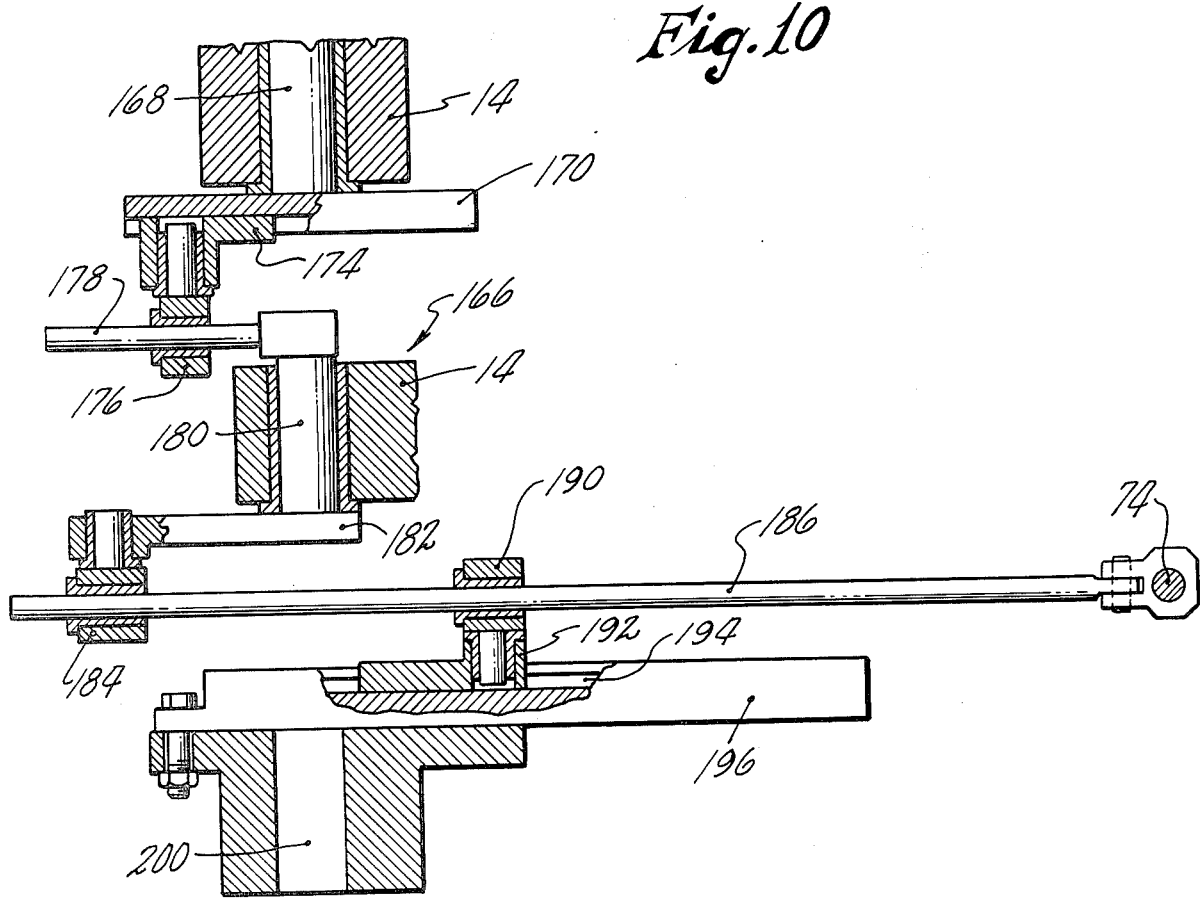
FIG. 10 is a plan view, but with parts shown in horizontal section, of the linkage shown in FIG. 9.

In FIGS. 9 and 10 a further alternative mechanism 166 is shown for stroking the valve and spindle. This mechanism also includes a crankshaft 168 which is rotatably supported in a portion of the machine frame 14 and driven at a constant speed of rotation. A circular flange 170 is provided on the projecting end of the shaft 168, and the said flange has a diametric way 172 in it to adjustably support a slide 174. The slide 174 pivotally supports a first slide joint 176 which receives a first lever 178 for axial sliding movement. As in the embodiment of FIGS. 6 and 7, adjustment of the slide 174 along the way 172 adjusts the spacing or eccentricity of the center of the slider joint 176 from the axis of the crankshaft 168 and this changes the ratio of return stroke velocity to cutting stroke velocity. The arc of turn of the crankshaft 168 during which return stroke takes place is designated $A_2$ and the arc of rotation of the crankshaft 168 in performing the cutting stroke is the much greater arc $A_1$.

The first lever 178 is secured to a stub or pivot shaft 180 having a second lever 182 extending therefrom. The second lever 182 at its projecting end rotatably mounts a second slider joint 184 which receives an elongated lever 186 for axial movement, the far end of the said elongated lever being pivotally connected to a nut 188 threaded on the upper extension 74 of the valve 63. A third slider joint 190 also receives the elongated lever 186 for axial movement between its ends. The slider joint 190 is pivotally mounted on a slide 192 which can be moved and held in adjusted position in a way 194 in a housing 196. The center of the slider joint 190 provides the fulcrum point 198 for the elongated lever 186. Thus, by adjusting the position of the slider joint 190 along the way 194 the amplitude of valve and spindle reciprocation is adjusted. The housing 196 is preferably mounted on a pivot shaft 200 so that it can be placed in adjusted angular position around the shaft 200 and thus raise or lower the fulcrum point 198, thereby adjusting the position of the valve 63 at the top and bottom of its stroke.

As the shaft 168 is rotated at uniform angular velocity, the levers 178 and 182 move at non-uniform angular velocities as a result of the changing effective length of the lever 178 in slider joint 176. As the lever 182 is rotated from its extreme displacement position toward the center of its arcuate motion, that portion of the elongated lever 186 between the fulcrum 198 and the nut 188 becomes gradually shorter. This results in a further reduction of the linear velocity of the valve 63 and spindle 12 from that which would result from the angular velocity of the lever 182.

It is to be understood that while the adjustment of stroke length has been described as being accomplished by movement of the slider joint 190 along the way 194, the same result can be accomplished by holding the slider joint 190 in a fixed position in the way 194 and by moving the slider joint 184 on lever 182 toward or away from the axis of the crankshaft 168. Also, slider joint 190 can be arranged to be moved vertically upwardly and downwardly rather than being angularly displaced by movement of the housing 196 around the axis of the shaft 200.

The velocity diagram in FIG. 11 shows the velocity curve 202 for the mechanism as shown in FIGS. 9 and 10 for comparison with the conventional velocity curve 162 provided by mechanical crank operation of the spindle. It will be observed that this mechanism provides for a substantial increase in the return velocity portion of the curve 202, while velocity change during the cutting stroke portion of the curve is minimal.

We claim:

1. A fluid operating and control mechanism for axial reciprocation of a spindle in a machine tool having a cylinder and wherein the spindle comprises a piston slidable in the cylinder and having first and second faces of respectively smaller and larger area, said spindle being provided with an axial bore, a valve reciprocable in said spindle bore and cooperating with the spindle to define first and second fluid passages in the spindle bore, conduit means including a pressure line for connection with a source of fluid under pressure and a drain line for returning fluid to the source at low pressure, the pressure line being arranged continuously to direct fluid against said first face, said first passage being disposed between said first and second faces and said second passage being disposed between said second face and said drain line, said valve being reciprocable in said first and second passages and arranged when moved in one axial direction to open said first passage and close said second passage and thereby cause movement of the spindle in said one axial direction in its working stroke and when moved in the opposite axial direction to close said first passage and open said second passage and thereby cause spindle movement in the said opposite axial direction in its return stroke, and mechanical drive means for reciprocating said valve.

2. The mechanism of claim 1, wherein the spindle and valve are not connected and are thus freely slidble relative to each other, whereby as the spindle encounters resistance during its working stroke the valve further opens the said first passage to said pressure line and thereby increasing the hydraulic pressure on said second face.

3. The mechanism of claim 1 including a driven gear connected to said spindle for rotating the same during its reciprocation.

4. The mechanism of claim 3 including guide means for the spindle having selected replaceable parts which cooperate selectively to impart additional rotation to said spindle during its reciprocation.

5. The mechanism as defined in claim 1 wherein the mechanical drive means for reciprocating the valve comprises a driven shaft and linkage means connecting said driven shaft and said valve and constructed and arranged to convert the rotary motion of the shaft to linear reciprocation of the valve.

6. The mechanism set forth in claim 1 wherein the mechanical drive means comprises a shaft driven at substantially constant velocity, a lever pivotally connected to the valve, and linkages connecting said shaft and lever including adjustable linkage means for converting the constant velocity rotary motion of said shaft into linear reciprocation of the valve at a relatively slow velocity during its movement in said one axial direction and at a relatively high velocity during its movement in said opposite axial direction, one cycle of valve reciprocation being completed during one revolution of said shaft.

7. The mechanism of claim 6 wherein the said lever is disposed for pivotal and sliding movement and the adjustable linkage means comprises a pivotally supported bushing for said lever which is adjustable relative to the axis of said constant velocity shaft and whereby the amplitude of linear reciprocation of the valve is adjusted.

8. The mechanism of claim 7 wherein the adjustment of said bushing relative to the axis of said shaft adjusts the ratio of velocity of the valve between its movements in said one and opposite axial directions.

9. The mechanism of claim 5 wherein the said linkage means connected to said valve is adjustable relative thereto to adjust the end positions of said valve in its linear reciprocation.

10. The mechanism of claim 6 wherein the connection of said lever to the valve is adjustable thereby to adjust the end positions of said valve in its linear reciprocaton.

11. The mechanism of claim 7 wherein the connection of said lever to the valve is adjustable thereby to adjust the end positions of said valve in its linear reciprocation.

12. The mechanism of claim 8 wherein the connection of said lever to the valve is adjustable thereby to adjust the end positions of said valve in its linear reciprocation.

13. The mechanism as set forth in claim 6 wherein the said linkages connecting said shaft and lever include means for permitting adjustment of the amplitude of valve reciprocation without substantial departure from the ratio of velocity of movement of said valve in said one axial direction to its velocity of movement in said opposite axial direction during such reciprocation.

* * * * *